Patented Mar. 6, 1951

2,543,972

UNITED STATES PATENT OFFICE 2,543,972

1,4-DISUBSTITUTED PIPERAZINES

Martin Everett Hultquist, Bound Brook, and Kenneth Leon Howard, Westfield, N. J., assignors to American Cyanamid Company, New York, N. Y., a corporation of Maine No Drawing. Application November 12, 1947, Serial No. 785,526

5 Claims. (Cl. 260—268)

The present invention relates to 1,4-disubstituted piperazines. More particularly, it relates to the preparation of 1,4-disubstituted piperazines in which one N-substituent is a five or six membered heterocyclic ring containing at least one nitrogen as a heterocyclic atom, and to the compounds so produced. More specifically, the new piperazine derivatives of the present invention may be represented by the following generic formula:

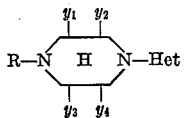

in which R is an alkyl, cycloalkyl, aryl, or aralkyl radical; Het is the heterocyclic radical, the bond from the 4-nitrogen to the heterocyclic radical being to the latter in a position adjacent to a heterocyclic nitrogen; and $y_1$, $y_2$, $y_3$ and $y_4$ are each hydrogen or lower alkyl radicals.

The group designated by R may be quite widely varied. It may represent variously, an alkyl radical, usually of about one to six carbon atoms such as methyl, ethyl, propyl, isopropyl, butyl, isobutyl, amyl, isoamyl, hexyl and the like; a cycloaliphatic radical such as cyclohexyl, ethylcyclohexyl and the like; an aryl radical such as phenyl, tolyl, xylyl, naphthyl or a halogen- or hydroxy-substituted derivative thereof; or an aralkyl radical such as benzyl, phenylethyl, methoxy-phenylmethyl or the like.

The group designated as Het is 5- or 6-membered nitrogen-containing heterocyclic radical. It may be substantially any such radical provided the bond thereto is a position adjacent to a heterocyclic nitrogen. Examples include 2-pyridyl, 2-pyrimidyl, 2-pyrazyl, 3-pyridazyl, 2-thiazyl, and their alkyl- or halogen-substituted heterocyclic ring derivatives.

The compounds of the present invention being 1,4-substituted piperazines, the latter ring is shown as saturated. However, in addition to the 1,4-substituents, the carbon atoms of the ring may also be substituted. As shown in the generic formula above, any or all of $y_1$, $y_2$, $y_3$ and $y_4$ may be either hydrogen or a lower alkyl group, particularly the methyl and ethyl radicals. The invention therefore contemplates 1,4-disubstituted mono-, di-, tri- and tetra alkyl piperazines such as 2-methyl or ethyl piperazine, 2,5 and 2,6-dimethyl and diethyl piperazines and tetramethyl piperazine.

The novel compounds of the present invention vary in physical character from colorless or light yellow oils, as in those cases where R is a lower alkyl radical, to colorless to yellow crystals where R is an aryl or aralkyl radical. These compounds are somewhat basic in character. Acid addition salts thereof are in general not too well defined, particularly when R is aryl or aralkyl. Stable, water-soluble salts such as the hydrochloride, hydrobromide, citrate or sulfate may generally be prepared from bases where R is alkyl or cycloalkyl. Some form with water of crystallization, and some are even hygroscopic. The bases are only slightly soluble in water, but generally soluble in chloroform, ether, the lower alkanols and, to a varying degree, in naphtha.

Preparation of the compounds is readily accomplished. A general procedure utilizes a suitable 1-substituted piperazine, i. e., a methyl, ethyl, phenyl, chlorophenyl, tolyl, phenylethyl, cyclohexyl, or the like piperazine, which is generally available per se or as a salt thereof, such as the hydrochloride. Piperazines with substituents other than nitrogen substitutents, 2-5-dimethyl piperazine for example, may be used. Either the base or the salt may be used. This is reacted with a halogen-substituted heterocyclic compound having the structure which is to be substituted on the other nitrogen.

The reaction is preferably carried out in the presence of an aqueous alkaline solution. Heating and agitation are usually required, ordinarily temperatures from about 125°–200° C. being employed. Heating at these temperatures is maintained for sufficient time to insure the reaction being carried as far as possible to completion. About 3 to 20 hours is usually required, although this time may increase or decrease, depending upon the heterocyclic compound being used and depending also upon the batch size and/or the temperature used. An exception occurs in the cases where halogen-substituted pyrimidines are utilized, for chloro or bromopyrimidines generally react exothermically with or without a solvent even under atmospheric conditions when the reaction is once initiated.

Isolation is relatively simple. Where the product forms an insoluble precipitate in the reaction mixture, it may be isolated by filtration and purified by distillation or recrystallization from a suitable solvent, dilute alcohol, or naphtha, for example. When the product is in the form of an oil, it may be extracted with a solvent, such as ether, isopropyl acetate, or the like. This extract may be dried and the product isolated and purified by distillation or isolated by precipitation from the solvent as its acid addition salt, such as the hydrochloride. The latter salt may be purified by recrystallization from a suitable solvent, such as alcohol, or a solvent mixture, such as acohol-ether, alcohol-isopropyl acetate, or the like.

Where it is desirable and possible to form a pure, stable acid salt of these new compounds, this may be accomplished by dissolving the free piperazine product in an essentially anhydrous solvent, adding an essentially anhydrous acid or acid solution to it, and isolating in any of the usual ways the salt thus formed. Acids useful in the preparation of such salts are hydrochloric, sulfuric, citric, hydrobromic and the like.

Typical compounds in accordance with the present invention include the following:

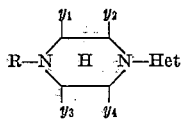

where $y_1$, $y_2$, $y_3$ and $y_4$ are H, methyl, or ethyl and R and Het have the following values:

| R | Het | R | Het |
|---|---|---|---|
| CH$_3$— | pyrimidyl | CH$_3$— | pyrazyl |
| C$_2$H$_5$— | " | phenyl— | " |
| iso—C$_3$H$_7$— | " | Cl—phenyl— | " |
| phenyl(H)— | " | CH$_3$O—phenyl—CH$_2$— | " |
| phenyl— | " | CH$_3$— | pyridyl |
| CH$_3$,CH$_3$—phenyl— | " | phenyl— | " |
| CH$_3$— | Cl-pyrimidyl | naphthyl— | " |
| phenyl—CH$_2$— | " | CH$_2$—phenyl—CH$_3$ | " |
| n—C$_5$H$_{11}$— | " | | thiazyl |
| | | phenyl— | " |

These compounds have been found to be pharmacologically active in various ways. Many of them have been found to show anti-spasmodic action, particularly against neurotropic spasm. More important, a number of the compounds have been found to possess particularly good analgesic properties.

The invention will be more fully illustrated in conjunction with the following examples which are meant to be illustrative only and not by way of limitation. All parts are by weight unless otherwise noted.

EXAMPLE 1

*1-phenyl-4-(2-pyridyl)piperazine*

1-phenylpiperazine is obtained as an oil by the treatment of 39 parts of 1-phenylpiperazine dihydrochloride (Pollard and MacDowell, J. A. C. S. 56 2199 (1934)) with an excess of an aqueous 33% caustic soda solution. To this oil is added 14 parts of 2-bromopyridine and 45 parts of 17.5% aqueous caustic soda, and the suspension is heated in an autoclave for 6 hours at 150° C. The 1 - phenyl - 4 - (2-pyridyl)piperazine, after three recrystallizations from dilute alcohol, melted at 108°-109.4° C.

EXAMPLE 2

*1-phenyl-4-(2-pyrazyl)piperazine*

A suspension comprising 194 parts 1-phenylpiperazine, 92 parts of 2-chloropyrazine and 140 parts of a 20% aqueous sodium hydroxide solution is heated, with shaking, for five hours at 200° C. The crude solid material resulting from the reaction is dissolved in 4000 parts of alcohol, filtered, and the filtrate is treated with an equal volume of water to separate a product which is distilled (B. P. 198°-200° C. at 2 mm.) and the yellow-colored distillate is recrystallized from alcohol as a bright yellow crystalline product which melts at 119°-120° C.

EXAMPLE 3

*1-phenyl-4-(2-pyrimidyl)piperazine*

To 48.6 parts of 1-phenylpiperazine is added 23 parts of 2-chloropyrimidine. The reaction mixture heats spontaneously and ice-water cooling is necessary. The reaction product is dissolved in 400 parts of five normal hydrochloric acid, filtered, the filtrate being then treated with 100 parts of 50% aqueous sodium hydroxide whereupon a solid separates. This solid after distillation (B. P. 180°–214° C. at 6 mm.) is crystallized from alcohol as a white crystalline material melting at 82°–83.2° C.

EXAMPLE 4

*1-phenyl-4-(5-chloro-2-pyrimidyl)piperazine*

To 81 parts of 1-phenylpiperazine is added 30 parts of 2,5-dichloropyrimidine. The reaction, which begins spontaneously may be moderated by cooling with ice water. The product of the reaction is dissolved in hot dilute hydrochloric acid which contains 50% of ethanol. The product which separates on cooling is the hydrochloride which melts at 245–248° C. The hydrochloride is dissolved in hot dilute aqueous ethanol and is treated with sodium hydroxide whereon the base separates out. The base is recrystallized from hot varnish maker's naphtha as a white product which melts at 116.6°–117.5° C.

EXAMPLE 5

*1-methyl-4-(2-pyridyl)piperazine dihydrochloride*

To 95 parts of 1-methylpiperazine dihydrochloride monohydrate and 50 parts of 2-bromopyridine, is added a solution of 65 parts sodium hydroxide in 235 parts of water. The mixture is heated for 20 hours at 150° in an autoclave and cooled, the cooled solution being then extracted with ether, and the ether layer dried over anhydrous sodium sulfate. Treatment of the ethereal solution with gaseous hydrogen chloride causes the separation of 1-methyl-4-(2-pyridyl)piperazine dihydrochloride. This dihydrochloride is crystallized from alcohol as the hemihydrate (M. P. 242–260° with decomposition).

EXAMPLE 6

*1-methyl-4-(2-pyrazyl)piperazine dihydrochloride*

A suspension of 9.6 parts of chloropyrazine in a solution previously prepared from 19 parts of 1-methylpiperazine dihydrochloride monohydrate in 115 parts of a 30% aqueous sodium hydroxide solution is heated in an autoclave at 200° C. for 16 hours and cooled. The cooled alkaline solution is extracted with ether, and the ether extract is treated with alcoholic hydrogen chloride. A precipitate of a tan colored dihydrochloride occurs. This salt melts at 243°–245° C.

EXAMPLE 7

*1-methyl-4-(2-pyrimidyl)piperazine dihydrochloride*

To a solution of 125 parts of 1-methylpiperazine dihydrochloride monohydrate in 690 parts of a 13.8% sodium hydroxide solution is added, at 70° C. over a period of 15 minutes, 57 parts of 2-chloropyrimidine. The mixture is heated and stirred at 95–98° C. for one hour and cooled. An oily product forms and is separated from the aqueous layer. This oil is dissolved in absolute ether, and is precipitated by the addition of excess dry hydrogen chloride. The hydrochloride is recrystallized from alcohol. It melts with decomposition over the range 266°–284° C.

EXAMPLE 8

*1-methyl-4-(2-thiazyl)piperazine dihydrochloride*

40 parts of 2-chlorothiazole is suspended in a solution of 95 parts of 1-methylpiperazine dihydrochloride monohydrate in 300 parts of a 22% aqueous sodium hydroxide. This mixture is heated for five hours at 150° C. in an autoclave. The product is filtered and the aqueous layer is extracted with ether. Ether is removed from the extract and the residue is distilled. The fraction boiling at 140–141° C. at 3 mm. pressure is collected, dissolved in ethanol, treated with hydrogen chloride and the resultant salt is collected. The hydrochloride softens at about 242° C. and melts at 245°–247° C.

We claim:

1. 1,4-disubstituted piperazine of the type formula

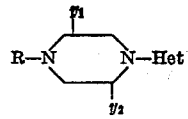

and acid salts thereof in which $y_1$ or $y_2$ are selected from the group consisting of hydrogen, methyl and ethyl, R— is a radical selected from the group consisting of the alkyl and hydroxyalkyl radicals of 1-6 carbon atoms, the cyclohexyl, phenyl, tolyl, naphthyl and benzyl radicals and the halogen substituted phenyl and tolyl radicals, and —Het is selected from the group consisting of the five and six membered nitrogen-containing heterocyclic radicals in which nitrogen is the only hetero atom and thiazyl, the bond from the piperazine being to a

position in the heterocyclic ring.

2. A substituted piperazine according to claim 1 in which —Het is

3. A substituted piperazine according to claim 1 in which —Het is

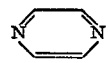

4. A substituted piperazine according to claim 1 in which —Het is

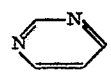

5. A substituted piperazine according to claim 1 in which —Het is

MARTIN EVERETT HULTQUIST.
KENNETH LEON HOWARD.

No references cited.